Jan. 3, 1961   E. W. SIMONS   2,967,035
HINGE MOUNTING FOR MIRRORS AND THE LIKE
Filed Sept. 23, 1957   2 Sheets-Sheet 1
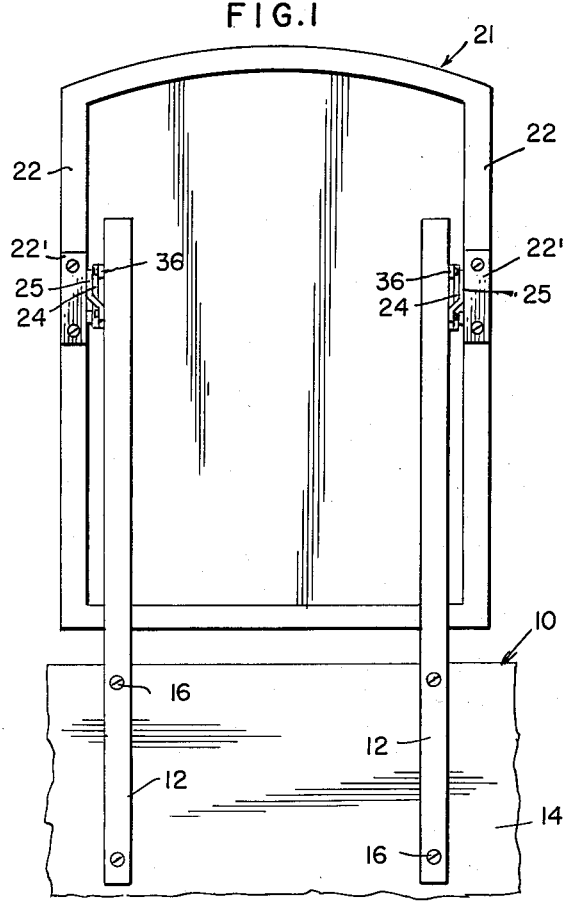
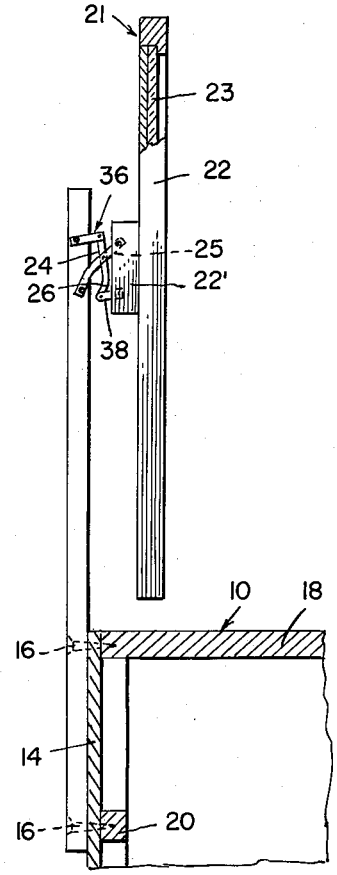
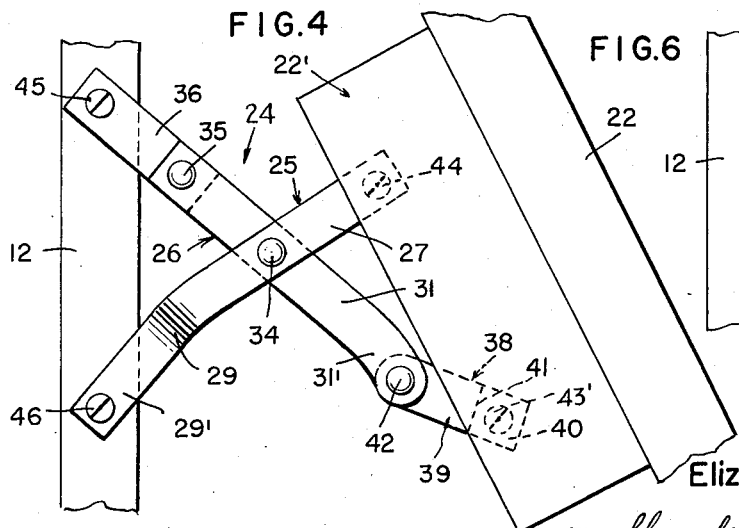
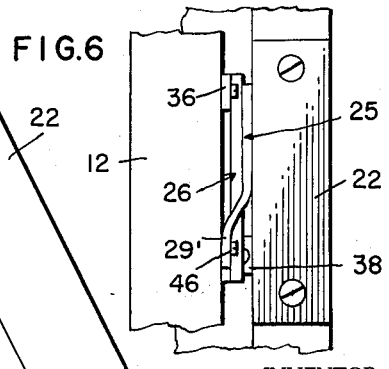
INVENTOR
Elizabeth W. Simons
By Shoemaker + Mattare
ATTORNEYS

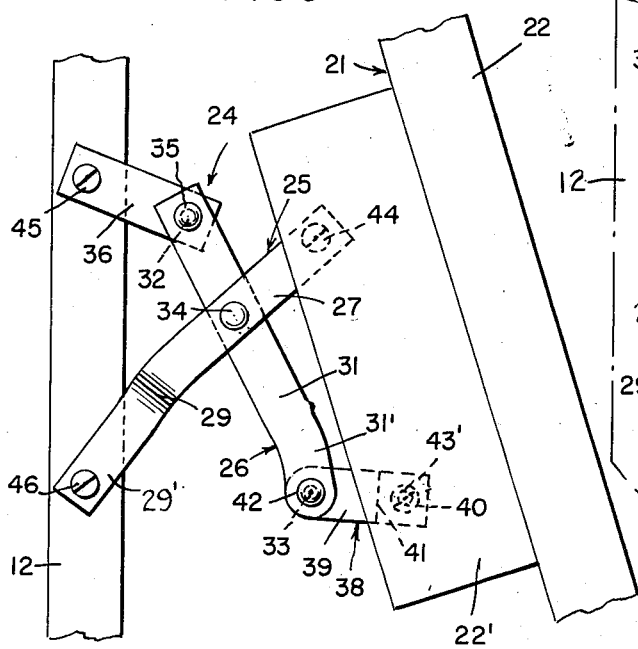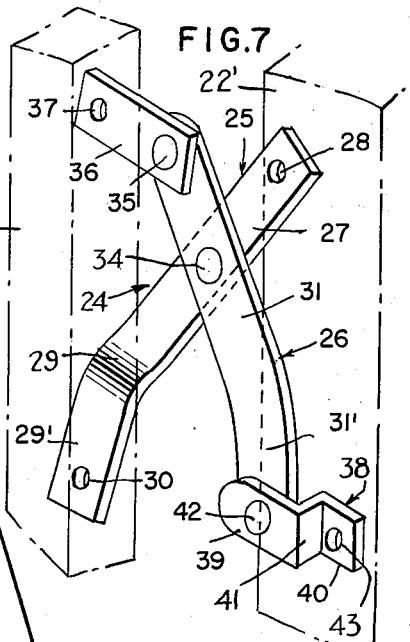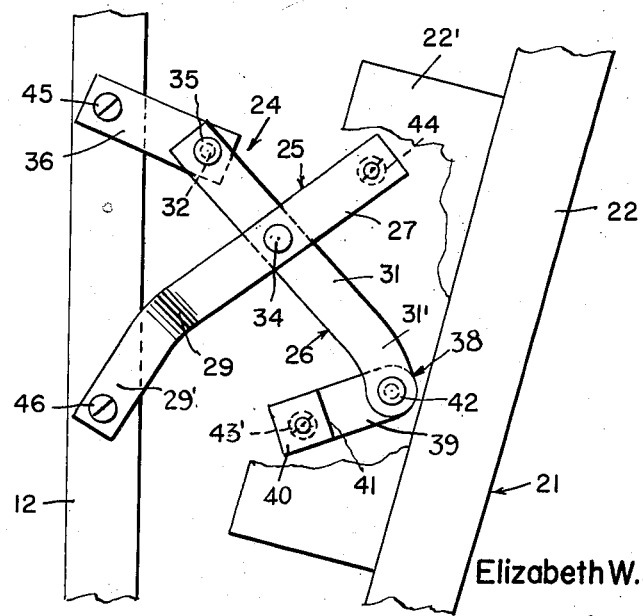

United States Patent Office 2,967,035
Patented Jan. 3, 1961

2,967,035

HINGE MOUNTING FOR MIRRORS AND THE LIKE

Elizabeth W. Simons, 3306 Rowan Road, Sedgefield, Greensboro, N.C.

Filed Sept. 23, 1957, Ser. No. 685,557

1 Claim. (Cl. 248—28)

This invention relates generally to pivot or hinge mountings or supports for mirrors and like structures.

Numerous mounting hinges or mounting devices have been made for supporting structures or bodies of the nature of mirrors in such a manner as to facilitate the tipping or tilting of the body to various positions for use. Such devices frequently employ tightening screws or the like to maintain the body at the desired tilted position and, therefore, it is necessary in order to move the body to such position to first loosen the holding device, then tilt the body and then tighten the holding device to maintain the body in desired adjustment.

A particular object of the present invention is to provide a novel hinge mounting for mirrors or similar bodies by means of which the body can be readily shifted or moved to any one of a number of tilted positions or set in a perfectly vertical position, without the necessity of having to manipulate tightening screws or the like and after being moved, the body will firmly maintain the position in which it is placed.

In addition to the foregoing, presently known hinge mountings for mirrors or similar bodies are of such a character that when the mirror or other body is tilted its top portion or its bottom portion swings in an arc in such a way that no material degree of tilt can be given to the body without having either the top or bottom thereof strike against the rearwardly positioned supporting uprights on which it is mounted or, if the body should be mounted between supports, against the wall adjacent to which it is positioned.

Accordingly a further object of the invention is to provide a new and novel hinge mounting for mirrors and like bodies which is adapted to connect the mirror or other body with a rearwardly positioned supporting structure or rear upright and which mounting will maintain the mirror in a forwardly offset position with respect to such rearwardly positioned uprights and will permit the mirror or other body to be tilted to greater angles than other types of supports, without striking against the supporting structure.

A further object of the invention is to provide a new and novel hinge mounting of the character stated which is so designed that it will not only permit a greater degree of tilt for the mirror or supported body, but which is designed so that the supported body can be shifted merely by grasping the lower portion of it and pulling it forwardly or pushing it rearwardly, according to whether it is desired to have the glass of the mirror or the face of the body directed upwardly or downwardly, and firmly hold its adjusted position without requiring the use of clamps or binding screws or other means which has to be hand manipulated.

Still another object of the invention is to provide a new and novel hinge mounting which will permit adjustments of the mirror or other body in the manner above stated and which in the making of the adjustment of the mirror will move the latter at its top or bottom substantially in a horizontal plane instead of swinging the same in an arc, as is the case in supporting means in which the body turns on two aligned and horizontal pivots.

Numerous other objects and advantages of the present invention will become apparent as the description of the same proceeds and the invention will be best understood from a consideration of the following detailed description taken in connection with the accompanying drawings forming part of the specification, with the understanding, however, that the invention is not confined to a strict conformity with the showing of the drawings but may be changed or modified so long as such changes or modifications mark no material departure from the salient features of the invention as expressed in the appended claim.

In the drawings:

Fig. 1 is a rear elevational view of a portion of an article of furniture showing a mirror supported thereon by uprights and hinge mountings constructed in accordance with the present invention;

Fig. 2 is a view partly in side elevation and partly in vertical section of the structure shown in Fig. 1 viewing the same from the right side of the figure and showing one of the hinge mountings and the manner in which the mirror is supported forwardly of the upright supports;

Fig. 3 is a detail view on an enlarged scale and in side elevation of one hinge mounting and adjacent portions of a supported body and a support and showing the relationship of the parts of the mounting when the supported body is tilted to have the face thereof directed forwardly and upwardly;

Fig. 4 is a view corresponding to Fig. 3 and showing the supported body tilted to the maximum or extreme position preparatory to reversing the parts of the hinge mounting to permit a reverse tilting of the mirror or supported body;

Fig. 5 is a view corresponding to Figs. 3 and 4 but showing the relationship of the parts of the hinge mounting when the mirror or supported body has been reversely tilted from the position shown in Fig. 3 so that the face of the mirror will be directed forwardly and downwardly;

Fig. 6 is a view on an enlarged scale looking at the hinge mounting from the right hand side of the back of the mirror and the support;

Fig. 7 is a view in perspective of one hinge mounting detached from the mounting block and support and showing in broken lines the attachments between the parts of the mounting and the block and support, the mounting appearing as viewed from the center of Fig. 1 looking toward the left.

Referring now more particularly to the drawings, Fig. 1 shows a rear view of an article of furniture such as a dressing table or the like upon which a mirror might be mounted, and the numeral 10 generally designates the base or lower part of such furniture article to which is secured a supporting means for a mirror or the like which is here shown as comprising two upright standards 12 the lower ends of which are disposed against the back wall 14 of the base 10 and secured thereto in a suitable manner as by means of screws 16 or the like, which, as illustrated in the sectioned lower portion of the view forming Fig. 2, may be located so as to pass into the rear edge of the top 18 of the base and into a rear reinforcing bar 20 which is conventional in bureaus or dressing tables or the like.

The supporting means for the mirror here shown as made up of two standards 12, may, if desired, be in the form of a single or one-piece body, such as a back vertical panel. Also while the standards 12 are here shown as secured by screws and may comprise bars of wood, it is also contemplated that use may be made of suitable metal bars of channel form secured at their lower ends in a suitable manner to the back wall 14 of the base as by the use of brackets or the like in the manner illustrated in my co-pending application Serial No. 652,002, filed April 10, 1957.

The numeral 21 generally designates a mirror structure wherein the vertical side members of the frame are designated 22 and, in Fig. 2, the mirror or glass is designated 23. In the mounting of the mirror by means of the mounting hinges of the present invention the supporting means or standards 12 will be spaced apart a distance less than the width of the mirror between the sides 22 thereof so that when the mirror is mounted by means of the hinge mountings upon the standards 12, the standards will be entirely hidden except for a very small portion of each visible between the bottom of the mirror and the top 18 of the base.

The hinge mountings upon the two sides of the mirror are of duplicate form and accordingly the following description will be directed to one only thereof and will apply to the other.

Each of the hinge mountings is generally designated 24 and in the installation of each there is employed a mounting block 22' which is secured to the back of the mirror side bar 22 and elements of the hinge mounting are attached to the inner side of this block adjacent to the rearmost face thereof and to the outer side or face of an adjacent standard 12 near the upper end of the latter.

The mounting 24 comprises two flat bars which are designated 25 and 26 and which, as shown, are placed in crossed relation, the cross-over points being adjacent to the ends of the bars or, in other words, being at one side of the transverse centers of the bars.

The bar 25 is in the form of a flat strip 27 of metal of suitable weight or strength. This bar is substantially straight and lies in one plane throughout the major portion of its length and has at one end, which may be identified as the upper end, an aperture 28 (see Fig. 7) to receive a pivot member as hereinafter described. Adjacent to its opposite or lower end, the body 27 is bent to extend obliquely, as at 29, to form the laterally offset terminal or lower end portion 29' which is also apertured as indicated at 30.

The bar 26 also comprises a flat metal body strip 31 having upper and lower end apertures 32 and 33 and this strip of material or body 31 has a lower longitudinally curved end portion 31'.

The body 27 forming the bar 25 in addition to having the laterally offset terminal lower end portion 29, also is longitudinally curved at its lower end in the offset portion 29' as shown.

The flat bodies 27 and 31 forming the hereinbefore stated bars 25 and 26 lie against one another and at the cross-over points they are pivotally coupled together by a rivet 34 or other suitable pivotal coupling. The arrangement of the bars 25 and 26 is such that when they are turned relative to one another on the rivet 34 toward a parallel relation, the curved lower end portions will be directed toward one another.

The top end or upper end of the body 31 constituting bar 26, has pivotally attached thereto by means of a rivet member 35 engaging in the aperture 32, a short attaching link 36 and the free end of this attaching link is apertured as at 37 to facilitate its connection by means of a pivot screw or the like to an upright or standard 12.

The link 36 is straight while at the bottom end of the bar body 31 there is attached an angled link which is generally designated 38 and which is approximately the same length as the link 36, but comprises the offset parallel portions 39 and 40 connected by the right angularly disposed intermediate portion 41. The end of the portion 39 is pivotally attached to the curved lower end portion 31' of the body 31 forming the bar 24, by means of a pivot screw or rivet 42 engaged in the aperture 33 in the curved end portion 31' and the end portion 40 of the angled link has an aperture 43 to receive a suitable pivot member such as a screw 43' or the like by which it is attached to a side of a mounting block 22', as shown.

As is clearly shown, the hinge mounting is connected to the inner side of a mounting block secured to the back of a side bar 22 of the mirror frame and to the support means such as the standard 12 by positioning the upper end of the bar 25, having the aperture 28 therethrough, against the side of the block 22' and pivotally securing it to such block by a screw 44 extended into the mounting block through the aperture 28, while the offset end 40 of the angled link 38 is also positioned against the inner side of the block 22' secured thereto by the screw 43' extended through the aperture 43.

In the upright position of the mirror frame with respect to the support means the links 36 and 38 will be arranged in substantially parallel relation and the link 38 will extend at an angle downwardly and rearwardly while the upper link 36 after being disposed in the downwardly and rearwardly extending position as shown in Fig. 2, will be secured by a suitable pivot screw or the like 45 to the adjacent support means, as for example to the side of the supporting standard 12. The offset portion 29' of the bar 25 will have a pivot screw or the like 46 passed through the aperture 30 and into the adjacent support means, such as the standard 12.

From the foregoing description, taken with the illustration of the mounting, it will be seen that when the mirror 21, or similar body, is in a vertical or upright position it will be maintained slightly forwardly of the plane of the support means, such as the standards 12, by the hinge mountings.

It will be understood that the pivotal connections between the bars and between the bars and links will be sufficiently tight to provide the necessary friction to hold the elements of the hinge mounting in the position to which the mirror may be tilted.

It will also be seen upon reference to Fig. 6, that by the provision of the lateral offset lower end portion 29 of the metal strip 27 forming the mounting bar 25, and by the provision of the angled link 38, the two bars 25 and 26 will be maintained in parallel relation at all times and the offset end portion 29 also permits the bar 25 to span or extend across the narrow space between the mounting blocks 22' secured to the mirror and the adjacent support means, such as the opposing sides or surfaces of the standards 12.

The hinge mounting of the present invention permits the mirror or similar body to be located forwardly of and in vertical position with respect to the support means, as stated, and it also permits the mirror to be tilted to have its face directed upwardly by merely pulling the bottom part forwardly. The mirror can be placed in any one of a number of angled positions with the bottom part extending forwardly or, in other words, with the mirror upwardly and rearwardly inclined.

If the reverse angular position of the mirror is desired, that is, if it is desired to have the lower end of the mirror extend back so that the mirror face is directed downwardly, this is accomplished by first swinging the lower end of the mirror to the extreme forward position where the bar 26 and the link 36 are brought into longitudinal alignment and then swinging the lower end of the link 36 downwardly and rearwardly while at the same time swinging the part 39 of the angled link upwardly and forwardly and forcing the lower end of the mirror backwardly. This returns the link 36 to its parallel relation with the bar 26 and permits the lower end of the link 36 to swing forwardly and upwardly while the angled link 38 swings over on its pivot 43' so that the pivoted end of the part 39 thereof swings forwardly and downwardly. Thus the mirror will then be tilted so that the upper end is forwardly of the lower end as illustrated in Fig. 5.

From the foregoing it will be seen that there is provided by the present invention a new and novel hinge mounting for mirrors and like bodies which has many advantages over mountings of presently known types. This present improved mounting permits the ready adjustment of the mirror to any number of different angular positions in addition to facilitating its support in completely vertical position and it also permits such extreme angular positions or tilting of the mirror without having it strike the rear support means.

Also the toggle-like character of the mounting facilitates the placing of the mirror in the different angular positions while at the same time eliminates the substantial swinging of the top and bottom of the mirror in an arcuate path. In other words, in shifting the mirror to the different angular positions or tilted positions, the bottom of the mirror moves substantially in a horizontal plane instead of swinging in an arc as would be the case if it were mounted on only two transversely aligned pivots.

I claim:

A hinge mounting for a body such as a mirror and the like designed to be suspended upon upright supporting bodies, said mounting comprising a first flat bar lying throughout its length in one plane, a second flat bar in crossed relation with and lying against one face of the first bar, a pivot coupling between the bars, the second bar lying in one plane from one end through the major part of its length and extending beyond said pivot coupling and then merging into an oblique portion to offset the remaining part of its length into a plane paralleling the said one plane of the second bar and located on the opposite side of the first bar from the said one face of the first bar, a short flat and straight link lying at one end flat against the face of the first bar at the end thereof nearest to the said one end of the second bar and on the said opposite side of the first bar, a second short link having a flat end portion at and pivotally attached to the other end of the first bar and lying against the said opposite side of the first bar, said second short link having a flat opposite end portion connected to the first mentioned end portion thereof by an intermediate portion extending across the edge of the first bar and thereby positioning the said opposite end portion adjacent to and parallel with the said one face of the first bar, the second bar having an aperture therethrough at each end and the other end of the first mentioned link and the said opposite end portion of the second mentioned link having an aperture therethrough, and the hinge mounting when in use between a support body and a supported body having the said one end of the second bar and the said opposite end portion of the second mentioned link pivotally attached to the supported body and having the other end of the second bar and the said other end of the first mentioned link pivotally attached to the support body.

References Cited in the file of this patent

UNITED STATES PATENTS 2,720,676    Vigmostad _____ Oct. 18, 1955

FOREIGN PATENTS 166,440    Switzerland _____ Mar. 1, 1934